US010147023B1

(12) United States Patent
Klaudiny et al.

(10) Patent No.: US 10,147,023 B1
(45) Date of Patent: Dec. 4, 2018

(54) MARKERLESS FACE TRACKING WITH SYNTHETIC PRIORS

(71) Applicant: Disney Enterprises, Inc., Burbank, CA (US)

(72) Inventors: Martin Klaudiny, Edinburgh (GB); Steven McDonagh, Edinburgh (GB); Derek Bradley, Zürich (CH); Thabo Beeler, Zürich (CH); Iain Matthews, Pittsburgh, PA (US); Kenneth Mitchell, Earlston (GB)

(73) Assignee: DISNEY ENTERPRISES, INC., Burbank, CA (US)

( * ) Notice: Subject to any disclaimer, the term of this patent is extended or adjusted under 35 U.S.C. 154(b) by 140 days.

(21) Appl. No.: 15/299,221

(22) Filed: Oct. 20, 2016

(51) Int. Cl.
| | |
|---|---|
| *G06K 9/62* | (2006.01) |
| *G06T 13/40* | (2011.01) |
| *G06T 19/20* | (2011.01) |
| *G06T 15/50* | (2011.01) |
| *G06K 9/00* | (2006.01) |
| *G06K 9/66* | (2006.01) |
| *G06T 7/20* | (2017.01) |

(52) U.S. Cl.
CPC ....... *G06K 9/6256* (2013.01); *G06K 9/00335* (2013.01); *G06K 9/66* (2013.01); *G06T 7/20* (2013.01); *G06T 13/40* (2013.01); *G06T 15/50* (2013.01); *G06T 19/20* (2013.01); *G06T 2200/08* (2013.01); *G06T 2207/20081* (2013.01); *G06T 2207/30201* (2013.01); *G06T 2207/30244* (2013.01)

(58) Field of Classification Search
CPC .............................. G06K 9/6256; G06K 9/66
USPC ....................................................... 381/103
See application file for complete search history.

(56) References Cited

U.S. PATENT DOCUMENTS

| | | | |
|---|---|---|---|
| 9,196,074 B1 * | 11/2015 | Bhat | G06T 13/40 |
| 2008/0205712 A1 * | 8/2008 | Ionita | G06K 9/00281 |
| | | | 382/118 |
| 2015/0169938 A1 * | 6/2015 | Yao | G06K 9/00261 |
| | | | 382/103 |

* cited by examiner

*Primary Examiner* — Raj Chakraborty
(74) *Attorney, Agent, or Firm* — Kilpatrick Townsend & Stockton LLP

(57) ABSTRACT

Provided are methods, systems, and computer-readable medium for synthetically generating training data to be used to train a learning algorithm that is capable of generating computer-generated images of a subject from real images that include the subject. The training data can be generated using a facial rig by changing expressions, camera viewpoints, and illumination in the training data. The training data can then be used for tracking faces in a real-time video stream. In such examples, the training data can be tuned to expected environmental conditions and camera properties of the real-time video stream. Provided herein are also strategies to improve training set construction by analyzing which attributes of a computer-generated image (e.g., expression, viewpoint, and illumination) require denser sampling.

21 Claims, 6 Drawing Sheets

MARKERLESS FACE TRACKING WITH SYNTHETIC PRIORS

BACKGROUND OF THE INVENTION

Animation is an ever-growing technological field. As computer systems and technology evolve, the methods and systems used to animate are also evolving. For example, conventionally, an animation was created by an artist creating each frame of an animated sequence. The frames were then combined to create an impression of movement. However, manually creating each frame was time consuming. In addition, inadvertent mistakes were introduced by artists simply because of the vast amount of detail required to create accurate animations.

Recently, methods and systems have been created to capture movements of subjects to create computer-generated subjects. For example, facial movements can be electronically converted to produce computer-generated animation. Currently, the main technique for facial motion capture is to have reference points associated with different places on a face (sometimes referred to as markers). These markers are then used to detect movement of the face. Unfortunately, capture of small facial movements can be missed when markers are not included where the small movements occur. Therefore, there is a need in the art for improved methods and systems for facial tracking.

BRIEF SUMMARY OF THE INVENTION

Provided are methods, systems, and computer-readable media for synthetically generating training data to be used to train a learning algorithm that is capable of generating computer-generated images of a subject. In some examples, the computer-generated images can be used to generate an animation of the subject captured by a stream of real images. The training data can be generated by modifying a facial rig to correspond to changes in expression and camera viewpoint. Using such training data can reduce the burden to capture and annotate images of a subject. In addition, such training data can allow generation of and training on any number of examples. Improvements to these techniques can be achieved by additionally changing illumination in the training data. For example, the training data can be tuned to expected environmental conditions and camera properties of a video stream. In some examples, the training data can be used for tracking faces in a real-time video stream. Provided herein are also strategies to improve training set construction by analyzing which attributes of a computer-generated image (e.g., expression, viewpoint, illumination, or other suitable attribute) require denser sampling. In some examples, a learning algorithm can be tested against computer-generated images that are rendered using similar techniques as those used to generate training samples.

In some implementations, a device, computer-program product, and method for training a regressor to be used to track a face of a subject is provided. For example, a method can include obtaining a facial rig associated with the subject. In some examples, the facial rig can include a plurality of expression shapes. In such examples, an expression shape can define at least a portion of an expression of the subject.

The method can further include generating a plurality of model states for the facial rig. In some examples, a model state can describe a combination of expression shapes defining an expression of the subject and a set of camera coordinates in relation to the subject. The method can further include determining a lighting characteristic to be used for at least one rendering of a computer-generated image.

The method can further include rendering a plurality of computer-generated images of a face of the subject. In some examples, a computer-generated image can be rendered using the lighting characteristic and a corresponding model state of the facial rig.

The method can further include generating a plurality of training samples. In some examples, a training sample can include a computer-generated image and a corresponding model state. The method can further include training an identification system using the plurality of training samples. In some examples, the trained identification system can be configured to infer a model state that corresponds to the face of the subject. In such examples, the face can be captured in an image.

In some examples, a system for face tracking can include a memory storing a plurality of instructions and one or more processors. In such examples, the one or more processors can be configurable to obtain a facial rig associated with a subject. In some examples, the facial rig can include a plurality of expression shapes. In such examples, an expression shape can define at least a portion of an expression of the subject.

The one or more processors can be further configurable to generate a plurality of model states for the facial rig. In some examples, a model state can describe a combination of expression shapes defining an expression of the subject and a set of coordinates in relation to the subject.

The one or more processors can be further configurable to determine a lighting characteristic to use for rendering a computer-generated image of a model state of the plurality of model states.

The one or more processors can be further configurable to render a plurality of computer-generated images of a face of the subject. In some examples, a computer-generated image can be rendered using the lighting characteristic and a corresponding model state of the facial rig.

The one or more processors can be further configurable to generate a plurality of training samples. In some examples, a training sample can include a computer-generated image and a corresponding model state.

The one or more processors can be further configurable to train a regressor using the plurality of training samples. In some examples, the trained regressor can be configured to infer a model state that corresponds to the face of the subject captured in a frame.

In some examples, a computer-readable memory storing a plurality of instructions executable by one or more processors, the plurality of instructions comprising instructions that cause the one or more processors to obtain a facial rig associated with a subject. In some examples, the facial rig can include a plurality of expression shapes. In such examples, an expression shape can define at least a portion of an expression of the subject.

The plurality of instructions comprising instructions that further cause the one or more processors to generate a plurality of model states for the facial rig. In some examples, a model state can describe a combination of expression shapes defining an expression of the subject and a set of coordinates in relation to the subject.

The plurality of instructions comprising instructions that further cause the one or more processors to determine a lighting characteristic to use for rendering a computer-generated image of a model state of the plurality of model states.

The plurality of instructions comprising instructions that further cause the one or more processors to render a plurality of computer-generated images of a face of the subject. In some examples, a computer-generated image can be rendered using the lighting characteristic and a corresponding model state of the facial rig.

The plurality of instructions comprising instructions that further cause the one or more processors to generate a plurality of training samples. In some examples, a training sample can include a computer-generated image and a corresponding model state.

The plurality of instructions comprising instructions that further cause the one or more processors to train a regressor using the plurality of training samples. In some examples, the trained regressor can be configured to infer a model state that corresponds to the face of the subject captured in a frame.

In some implementations, a model state of the plurality of model states can be generated by modifying one or more expression shapes. In such implementations, the one or more expression shapes can be modified to correspond to an expression of the face of the subject.

In some implementations, a model state of the plurality of model states can be generated by modifying one or more coordinates of a set of camera coordinates. In such implementations, the one or more coordinates can represent a deviation from a camera pose.

In some implementations, the lighting characteristic can be used to render a first computer-generated image of a first model state of the plurality of model states. In such implementations, a second lighting characteristic can be used to render a second computer-generated image of the first model state.

In some implementations, the method, system, and computer-readable media can further include determining a default model state for the facial rig. In such implementations, a model state of the plurality of model states can include a modification of the default model state.

In some implementations, the regressor can be trained by determining transitions for training samples. In such implementations, a transition can predict a first model state in a first frame and a second model state in a second frame that follows the first frame.

In some implementations, the image can be a current frame of a real-time stream. In some implementations, the plurality of model states can be generated based on one or more expected conditions of the image. In such implementations, the lighting characteristic can be determined based on the one or more expected conditions.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by embodiments and optional features, modification and variation of the concepts herein disclosed may be resorted to by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will be described in more detail below in the following specification, claims, and accompanying drawings.

BRIEF DESCRIPTION OF THE DRAWINGS

Illustrative embodiments are described in detail below with reference to the following figures.

DETAILED DESCRIPTION OF THE INVENTION

Figure 1:
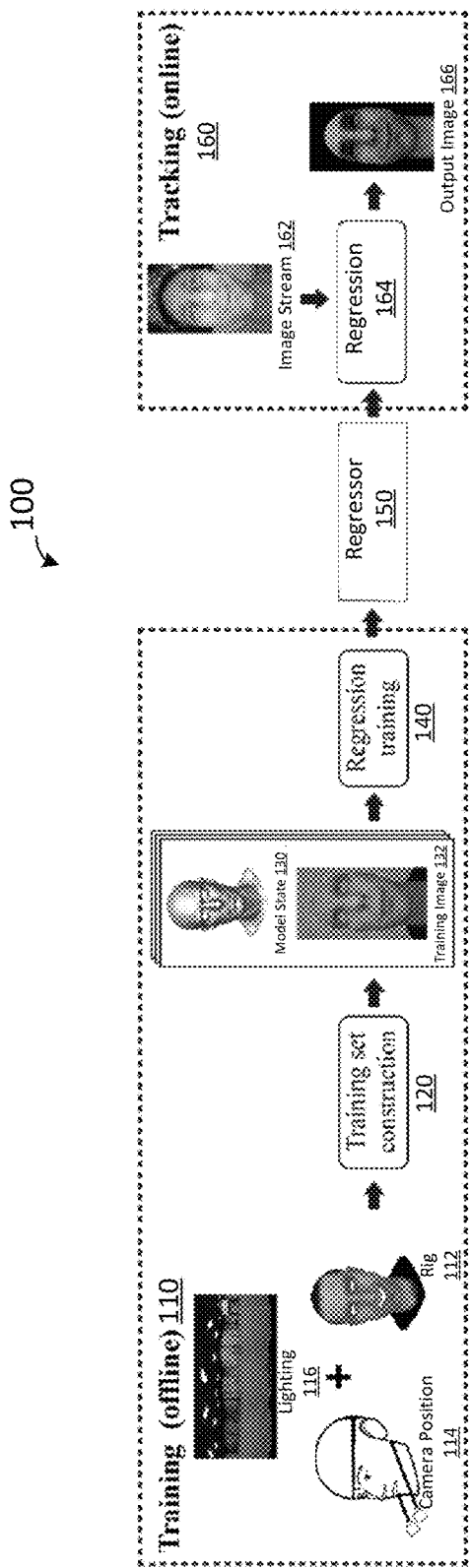
FIG. 1 illustrates an example of a tracking framework.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Real-time facial capture, which allows for fast inference of facial geometry from video streams, has recently been gaining popularity in virtual film production. In some examples, real-time facial capture can allow a computer-generated face to be produced in real time, the computer-generated face corresponding to a face in an input video.

As described above, facial capture was traditionally performed using markers. However, real-time markerless facial capture has received more attention recently. Many of the proposed techniques for real-time markerless facial capture are generic in that they do not require any user-specific training upfront, and as such are extremely flexible in their use. The downside of these techniques is reduced accuracy, particularly when it comes to person specific features, but also in the overall shape and face appearance.

Other techniques can promise greater accuracy when trained for a particular person. Such training requires user-specific input data, such as images and potentially geometry, as well as labels for that data. And because the variation of the facial appearance caused by changing expressions is rather substantial, a relatively large training set typically consisting of dozens of images has to be provided to train a learning algorithm for a single illumination condition from a single viewpoint.

Unfortunately, restricting acquisition to a single known illumination and viewpoint is often too much of a limitation and most learning algorithms extrapolate poorly to footage acquired under different environmental conditions and/or from different cameras. Traditional learning algorithms for large variation in lighting and viewpoint would lead to an unbearable amount of labor to acquire and label the required training data.

Furthermore, the required training data can typically only be acquired under certain conditions, precluding training the learning algorithm for different scenarios. An example is the established industry practice to capture an actor in a well calibrated, highly-constrained capture setup to create a high quality digital double. However, this only represents a single angle using a single illumination with a single expression.

This disclosure describes methods, systems, and computer-readable media for synthetically generating training data. In some examples, the training data can be tuned to different expressions, camera properties, and/or expected environmental conditions. The training data can be used to train a learning algorithm to be able to recognize a face of a person during facial capture.

Synthetic training can reduce the burden to capture and annotate pictures significantly. In addition, synthetic training can allow generation and training on arbitrarily large amounts of data, replacing tedious construction of training sets from real images by rendering a facial rig under on-set conditions expected at runtime.

Even with synthetic training, practical realities, such as training time and compute resources, may still limit the size of any training set. In some examples, to solve these practical realities, strategies are provided for constructing smaller training sets without sacrificing tracking performance by analyzing which attributes of a computer-generated image (e.g., expression, viewpoint, and illumination) require denser sampling. Such strategies can allow construction of an actor-specific training set when given defined constraints (e.g., a budget of time, resources, or other constraint), which can be particularly important for on-set facial capture in film and video game productions. In addition, informed reductions of training set size can reduce computation time while maintaining tracking accuracy.

FIG. 1 illustrates an example of a tracking framework 100 for performing markerless tracking using a learning algorithm (e.g., a regressor 150). While the description herein is related to tracking of a face, other subjects can be tracked (e.g., a body of a person, all or part of an animal, or an inanimate object). In fact, any subject that is capable of being modeled on a computer can be tracked using the tracking framework 100.

The tracking framework 100 can include a training stage 110 for training the regressor 150. The regressor 150 can be trained to recognize an expression of a subject in an image. To train the regressor 150, one or more training pairs can be constructed (e.g., training set construction 120). In examples with multiple training pairs, each training pair can be different. For example, an expression (using a rig 112), a viewpoint (using a camera position 114), an illumination (using a lighting 116), or any combination thereof can be modified for each training pair to create different training pairs.

In some examples, a training pair can include a model state 130 and a training image 132. The model state 130 can define how to configure the rig 112 to create a particular expression. The model state 130 can also define the camera position 114. The training image 132 can be a computer-generated image of the subject using the rig 112 based on the model state 130. In some examples, an illumination of the training image 132 can be modified based on indications provided in the lighting 116.

The one or more training pairs constructed during the training set construction 120 can be used to train the regressor 150 during regression training 140. After the regression training 140, the regressor 150 can be used to perform markerless face tracking. Markerless face tracking can include a regression 164 of the regressor 150 receiving an image stream 162. The image stream 162 can include an image with the subject that the regressor 150 was trained for. The regression 164 can identify a model state associated with the image. Then, based on the identified model state, an output image 166 can be generated. The output image 166 can correspond to the image in the image stream 162. In some examples, several output images can be created sequentially from several images of the image stream 162 to create an animation of output images that correspond to movements occurring in the image stream 162.

As described above, one or more training pairs can be constructed. Each training pair can include a model state 130 and a training image 132. In some examples, a model state (such as the model state 130) can be defined as S=(a, r, t), where S is the model state, a is a facial expression of the model state (e.g., one or more values for one or more attributes that cause a rig to correspond to a particular state), r is a rotational position of a camera with respect to a face (e.g., pitch, yaw, and roll), and t is a translational position of a camera with respect to the face (e.g., abscissa, ordinate, and applicate).

In some examples, an expression $\hat{a}_n$ of a model state $\hat{S}_n$ can define a facial shape and skin appearance for a particular expression. The expression $\hat{a}_n$ can include one or more attributes that correspond to a rig, the one or more attributes affecting an appearance of an image generated using the rig. For example, an attribute can correspond to opening a mouth. In another example, an attribute can correspond to the mouth in its entirety. In some examples, each attribute can include a corresponding weight. The corresponding weight can affect how much of a particular expression is used. In one illustrative example, a smile can be associated with an attribute. In such an example, when a corresponding weight is 1, the rig 112 can be configured for a full smile. Further, when the corresponding weight is 0.5, the rig 112 can be configured for a half smile. Other weights can also be used, including different percentages corresponding to different amounts.

In some examples, an arbitrary number $N_E$ of different expressions (e.g., an expression $\hat{a}_n$) can be generated. In some examples, full weights (e.g., 1) of each attribute of the expression $\hat{a}_n$ can be used. In such examples, the expressions with full weights of each attribute can represent a subject's range of expression well and constitute physically plausible facial expressions unlike most arbitrary points in a blendshape space, where the blendshape space includes one or more possible configurations of the rig 112.

Figure 2:
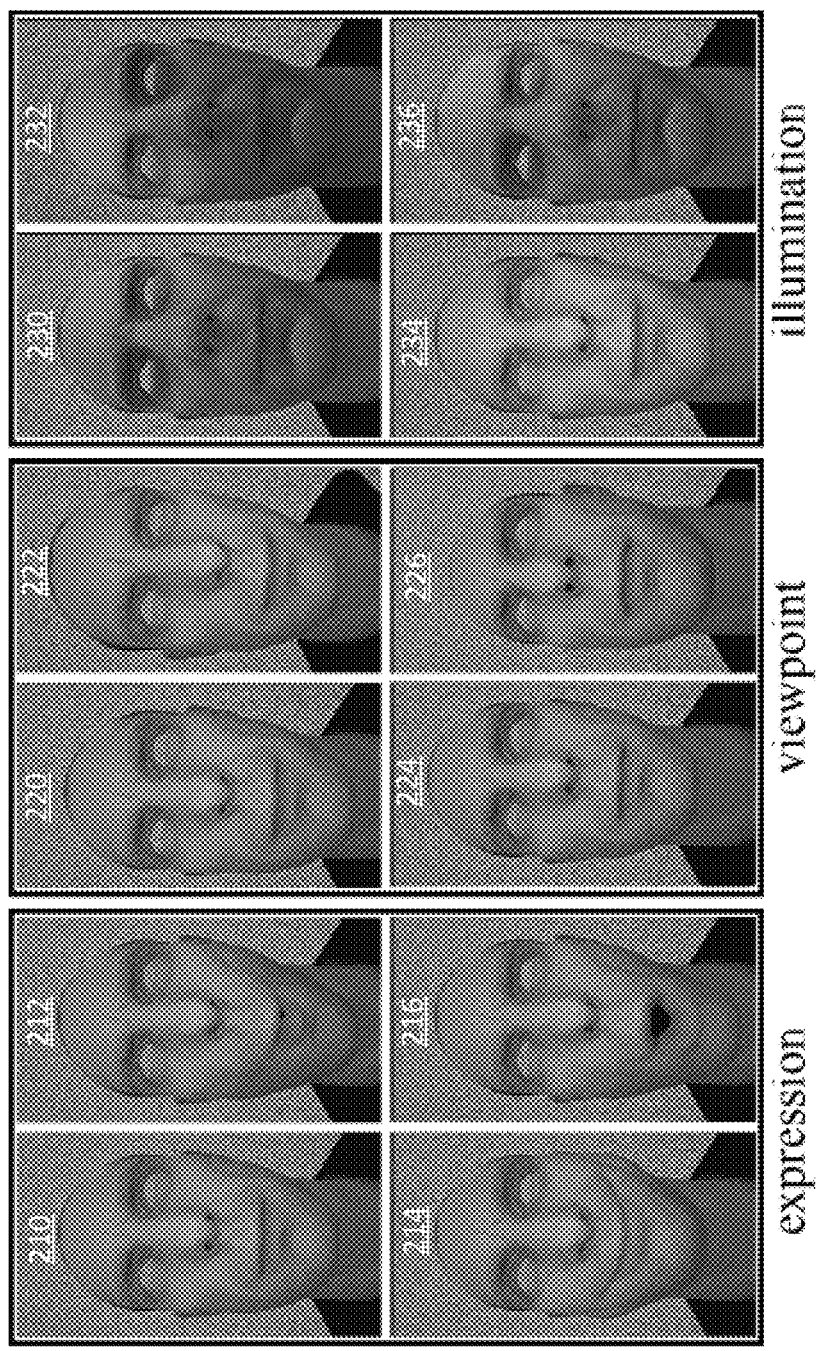
FIG. 2 illustrates examples of computer-generated images with changes in expression, viewpoint, and illumination.

Example images rendered from an expression space are provided in FIG. 2. The expression space can be one or more possible expressions that can be created using a rig (e.g., the rig 112). For example, image 210 can illustrate a first expression (e.g., a resting or default expression). Image 212 can illustrate a second expression (e.g., a duck face). Image 214 can illustrate a third expression (e.g., a smile). Image 216 can illustrate a fourth expression (e.g., an "O" face). While the different images illustrating changes in expression do not also modify viewpoint or illumination, in some examples, an expression, a viewpoint, an illumination, or any combination thereof can be modified for an image. For example, the image 212, which illustrates a second expression, can be combined with a viewpoint modification and/or an illumination modification.

As described above, the model state $\hat{S}_n$ can include a rigid transform $(\hat{r}_n, \hat{t}_n)$ that represents deviation from a camera rest pose. The camera rest pose, with respect to the face, can be given by a real camera calibration together with fixed intrinsic parameters. Viewpoint variance can help because helmet cameras can slide on the head in practice and camera-shake can become evident during rapid head motion. In some examples, motion of a real helmet camera relative to the face can be analyzed to determine ranges of rotation and translation with respect to the camera rest pose. In addition, approximate anisotropic distributions over r and t can be sampled uniformly to generate $N_V$ distinct transforms.

Example images rendered from a viewpoint space are provided in FIG. 2. The viewpoint space can be one or more possible viewpoints that are based on a camera position (e.g., the camera position 114). For example, image 220 can illustrate a first viewpoint (e.g., a straight on or default viewpoint). Images 222, 224, 226 can illustrate different viewpoints. While the different images illustrating changes in viewpoint do not also modify expression or illumination, in some examples, an expression, a viewpoint, an illumination, or any combination thereof can be modified for an image. For example, the image 222, which illustrates the second viewpoint, can be combined with an expression modification similar to the image 214 and/or an illumination modification.

In some examples, a rendering engine (e.g., a video game engine for rendering graphics) can be used to render one or more computer-generated images using a rig for a subject, as real-time rasterization on a graphics processing unit (GPU) can provide good image quality and fast rendering. The rendering engine can allow variable placement of a virtual camera, modeled according to calibration data of a real head-mounted camera. Of course, other engines can be used to render the one or more computer-generated images.

In some examples, illumination in rendered images can be controlled. For example, point lights can be used to simulate helmet-mounted illumination. In addition, an environment map can model surrounding environmental lighting conditions, based on light probe data acquired at the target location. Both the environment map and the point lights can be used to change the illumination in the rendered images. In some examples, the illumination can be described in a variable (e.g., lighting 116) received by the system. The lighting 116 can indicate what kind of lighting to apply to a particular image. For example, the lighting 116 can indicate a point light coming from a particular position.

Example images rendered from an illumination space are provided in FIG. 2. The illumination space can be one or more possible illuminations to be applied to an image that are based on a light definition (e.g., the lighting 116). For example, image 234 illustrates a first illumination (e.g., a default illumination). Image 230 illustrates a second illumination (e.g., a light from the top right of the image 230). Image 232 illustrates a third illumination (e.g., a light from the top left if the image 232). Image 236 illustrates a fourth illumination, which is similar to the second illumination. While the different images illustrating changes in illumination do not also modify expression or viewpoint, in some examples, an expression, a viewpoint, an illumination, or any combination thereof can be modified for an image. For example, the image 230, which illustrates the second viewpoint, can be combined with an expression modification similar to the image 214 and/or an illumination modification similar to the image 222.

In some examples, the rig 112 can be specific to a face. The rig 112 can be defined as $B=\{B_j\}_{j=0}^{J}$ where B is the rig, $B_j$ is a state of the rig 112, j=0 is a resting state of the rig 112, and 0 through J indicate different expressions for the rig 112. In some examples, the rig 112 can be a model constructed particularly for a face of a subject. In such examples, the rig 112 can be built before the training set construction 120 is performed. In some examples, the rig 112 can be a blendshape rig. The blendshape rig can include one or more facial expression shapes and associated texture and normal maps. In other examples, the rig 112 can be a joint-based rig. A person of ordinary skill in the art will recognize that any kind of rig can be used. In some examples, the rig 112 can be built using an offline facial capture system. In other examples, the rig 112 can be built using a different system.

In some examples, a facial expression component of the model state (i.e., a) can be used to change a resting state (referred to herein as $B_0$) of the rig 112. For example, the resting state of the rig 112 can be augmented using the facial expression component such that the facial expression component defines the 3D shape of the expression $B=B_0+\Sigma_{j=1}^{J} a_j (B_j-B_0)$.

In some examples, a computer-generated image of a face can correspond to a model state (and/or vice versa). In such examples, the computer-generated image can be paired with the corresponding model state to create a training sample pair (e.g., $(I_n, \hat{S}_n)$, wherein $I_n$ is a computer-generated image and $\hat{S}_n$ is a model state used to render $I_n$). In some examples, because the generation of a training sample pair uses the rig 112, the training sample pair can provide exact correspondence between $I_n$ and $\hat{S}_n$. Moreover, by using $\hat{S}_n$, the training stage 110 can allow flexibility to render a training set tailored to an expression range of a subject, physical properties of a camera rig, and environment lighting conditions.

In some examples, a plurality of model state and computer-generated image training sample pairs can be generated, each with a different model state (e.g., with different expressions and camera viewpoints) and/or a different computer-generated image (e.g., different illumination). The plurality of training sample pairs can then be used as a training set to train a learning algorithm. Because the plurality of training sample pairs are based on the rig 112 for a particular face, the learning algorithm can produce a subject-specific system (e.g., a regression 164) that is capable of recognizing a state of the face of the subject in an image stream 162.

In some examples, when determining which training sample pairs to use to train the regressor 140, the training sample pairs can be sampled from a space defined by expression, viewpoint, and illumination modifications. In such examples, computer-generated images can be rendered according to different combinations of blend weights, camera transforms, and lighting configurations that are selected from the informed sets with sizes $N_E$, $N_V$ and $N_I$.

Figure 3:
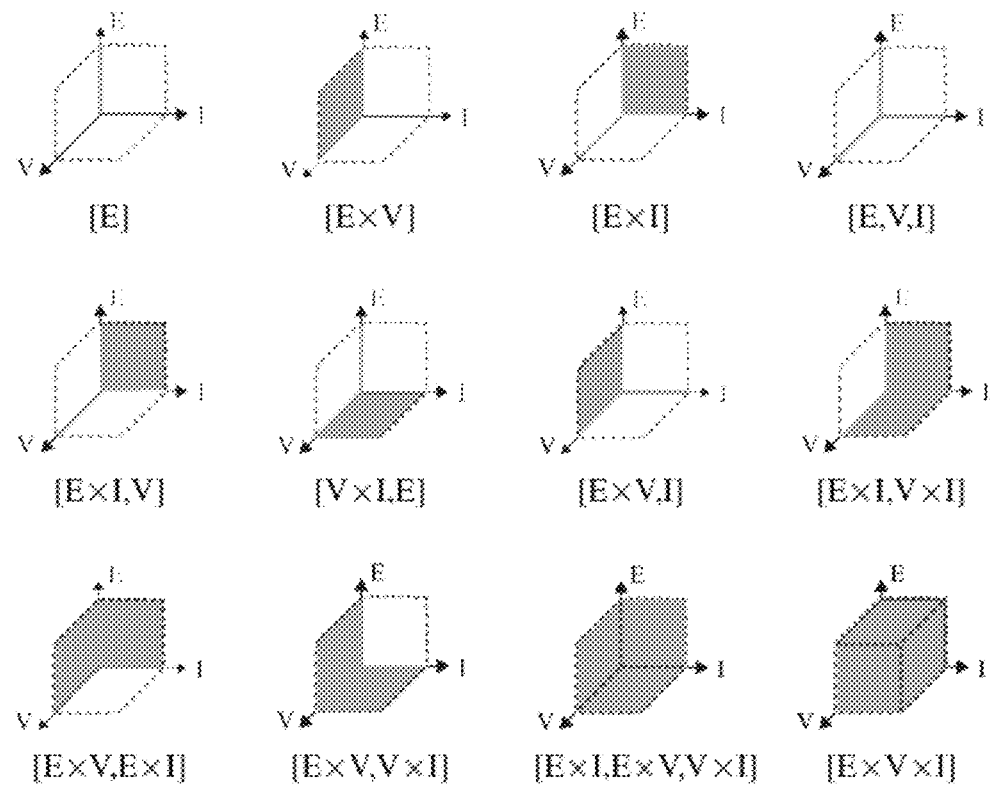
FIG. 3 illustrates examples of design strategies for training set construction.

A first strategy for sampling as described in the previous paragraph can include generating a triple cross product [E×V×I], which includes all possible combinations. In some cases, this can entail relatively expensive construction and subsequently long training times. As an alternative, different design strategies can result in a significant reduction of training set sizes and, importantly, training times. Some strategies are illustrated in FIG. 3 and focus on different combinations of individual axes and the planes defined by sampling axis cross products. The origin of the sample space represents a facial image with a neutral expression ($\hat{a}$=0), the rest camera pose (($\hat{r},\hat{t}$)=identity) and the reference illumination. As a notation example, the training set design [E×I,V] contains a full cross product of all expressions and illumination axis samples viewed from (only) the rest camera viewpoint, combined with the neutral expression under the reference illumination observed from all viewpoint axis samples. This set design results in ($N_E \cdot N_I + N_V$) training images.

In some examples, the regressor 150 can be trained by associating model states with other model states that are likely to occur near in time (e.g., transitions). For example, a model state (e.g., $\hat{S}_n$) representing a full smile can be associated with a model state representing a half smile. In such an example, the training can allow the regressor to determine that if a previous frame is a full smile, the current frame is likely to be a half smile. Such training allows the regressor 150 to predict a change in a model state of a preceding frame and a model state of the current frame when presented with a computer-generated image that corresponds to the current frame. By reducing the number of possible model states to compare with an image, efficiencies can be gained when analyzing several images in a row that represent an image stream. This can enable online tracking of consecutive frames.

Transitions, as described in the previous paragraph, can be implemented by augmenting input training pairs ($I_n, \hat{S}_n$) with a set of initial states $S_m$ that model potential state transitions. The training samples provided to the algorithm therefore have the form ($I_m, \hat{S}_m, S_m$). The first group of potential initial states describe expression transitions which are formed by the $m_E$ expressions closest to $\hat{a}_n$ in all N training pairs. Similarity of two expressions can be computed as the sum of 3D Euclidean distances between the two face shapes. The second group of initial states describe camera pose transitions, where the ground-truth pose ($\hat{r}_n, \hat{t}_n$) is locally perturbed $m_T$ times. Specifically, multiple spatial offsets can be generated from ($\hat{r}_n, \hat{t}_n$) with constant step sizes along each translation axis and around each rotation axis. This sample augmentation strategy differs from previous methods, providing simpler design yet aiding regression stability. The training set augmentation process can expand the final number of training samples to M=($m_E + m_T$)×N.

In some examples, a cascaded regression scheme can be used to learn the mapping between input image features sampled from $I_m$ and transitions from $S_m$ to $\hat{S}_m$. The cascaded regression scheme can include T stage regressors comprising sequential chains of F random ferns. Input features for weak fern regressors are greyscale pixel differences projected and sampled from 3D point pairs randomly scattered across the facial rig. For example, a difference can be computed between a point on an eye brow using the facial rig with a first model state and the point on the eye brow using the facial rig with a second model state. These features are mapped to learned increments of δS. The D pixel differences are selected from a pool of U sampling points for each fern independently. Correlation across all M training samples is computed between possible pixel differences and the residuals ($S_m - \hat{S}_m$) and the most correlated differences are selected.

Because the output variables (a, r, t) have different scales, each output variable can be weighted based on their influence on the correlation. In some examples, a unit change can be applied to a particular target variable and a resulting change can be computed using the rig 112. The weights can then be determined according to normalized magnitudes of the rig 112 change. Spatial locality of features can also be enforced. In some examples, a simple 3D distance threshold (e.g., 10 mm) can reduce the pool of $U^2$ potential pixel differences prior to correlation computation.

The random fern approach can provide real-time estimation of a model state for the image. In some examples, to increase robustness and temporal coherence of the final solution, multiple independent regressions can be run in parallel at a certain interval of frames (e.g., every frame, every other frame, or other suitable interval) and results of the independent regressions can be averaged together. Each independent regression can be initialized from different model states $S_l$ which are derived from the solution $\tilde{S}$ in the previous frame. The $1_E$ closest expressions and $1_T$ closest camera transforms to $\tilde{S}$ can be searched for in all training pairs ($I_n, \hat{S}_n$), applying the similarity metric based on vertex distances used during training. As a last step, a light-weight Gaussian temporal filter can be employed with window size w to aid temporal smoothness.

In some examples, a trained regressor can be tested before being used on a real image. For example, the trained regressor can be given one or more computer-generated images. In some examples, a computer-generated image can be created using a model state not used in training. In other examples, the computer-generated image can be created by a random model state, which could or could not have been used during training. In other examples, the computer-generated image can be created based on a model state that the regressor can be expected to see. In some examples, the computer-generated image can also be modified by changing an illumination characteristic. For example, the computer-generated image can be rendered with a point source of light in a particular position.

When given the computer-generated image, the trained regressor can determine a model state for the computer-generated image. However, because the computer-generated image was created using a model state, the model state determined by the regressor can be compared to the model state used to create the computer-generated image to assess accuracy of the regressor. If the accuracy is within a range, the regressor can be considered trained. If the accuracy is not within the range, the regressor can continue to be trained. In some examples, when the regressor is continued to be trained, the additional training sets can be associated with model states or illuminations that are similar to the ones that caused the regressor to not be within the range of accuracy. In other examples, the additional training sets can be randomized.

In some examples, the regressor 150 can track faces from an image stream (e.g., online from a monocular image stream) using a regression 164. For example, the regression 164 can receive an image stream 162 as input. The regression 164 can determine a model state associated with a face of a subject in each image of the image stream. In some examples, the model state can be determined using the cascaded regression scheme described above. For example, a previous model state can be determined for a previous frame. When determining a current model state, possible transitions from the previous model state can be compared to a current image. By limiting possible model states to the model states that are possible transitions from a previous model state, the number of comparisons can be reduced.

After determining the model state, the regressor can generate an output image 166 for the model state. By generating the output image 166 for the determined model state, the regressor is essentially converting the face of the subject into a computer-generated image. A group of computer-generated images corresponding to the input image stream can be rendered to provide an animation of the image stream.

Figure 4:
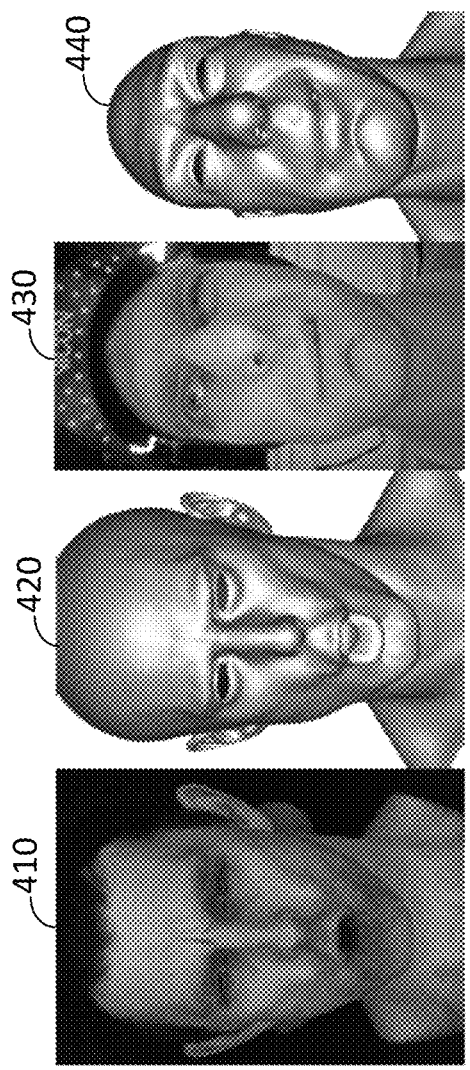
FIG. 4 illustrates examples of real images converted to computer-generated images.

FIG. 4 illustrates examples of real images converted to computer-generated images. For example, a first real image 410 can be received by a regressor. In such an example, the regressor can output a first computer-generated image 420. Similarly, in an example, a second real image 430 can be received by the regressor. In such an example, the regressor can output the second computer-generated image 440.

In some examples, the first real image 410 can be received in an image stream. In such examples, the second real image 430 can be received in the image stream. In such examples, the second real image 430 can come after the first real image 410. With the image stream, the first computer-generated image 420 can be generated first, followed by the second computer-generated image 440, appearing as if a face of the subject in the computer-generated images went from a state in the first computer-generated image 420 to a state in the second computer-generated image 440.

Figure 5:
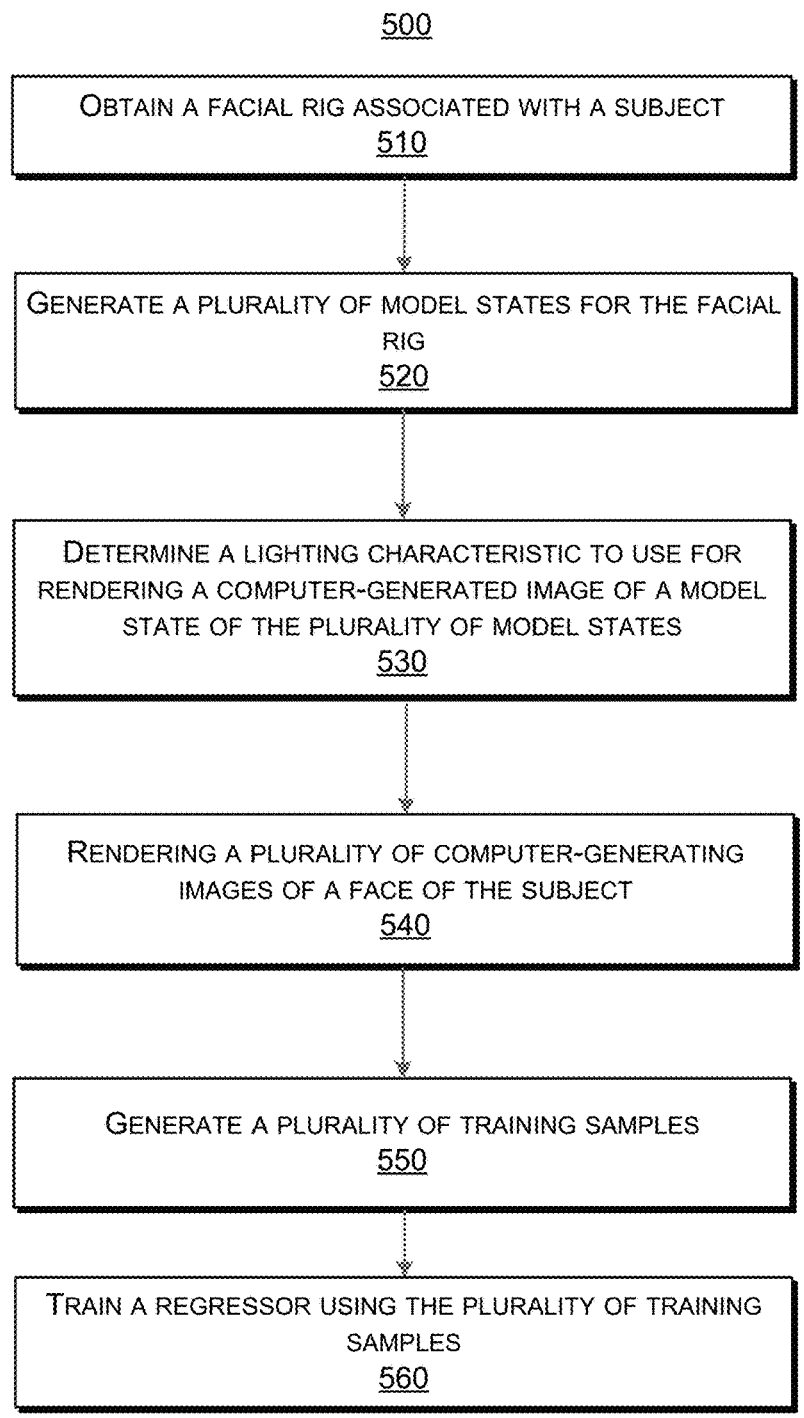
FIG. 5 illustrates an example of a process for training a regressor to perform face tracking.

FIG. 5 illustrates an example of a process 500 for training a regressor to perform face tracking. Process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 500 can be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

At 510, the process 500 includes obtaining a facial rig (e.g., rig 112) associated with a face of a subject. In some examples, the facial rig can include a plurality of expression shapes. In such examples, an expression shape can define at least a portion of an expression of the subject (e.g., an eye brow, a lip, an eye lid, etc.). In some examples, the facial rig can be a blendshape rig. In other examples, the facial rig can be a different type of rig, such as a joint-based rig.

In some examples, the subject can be a person, a monster, an alien, an animal, or any other sentient being. In other examples, the process 500 can include obtaining a rig associated with the subject. In such examples, the rig would not be a facial rig because it would not be for a face of the subject. Instead, the rig would describe a different portion of the subject, such as a body. In other examples, the subject can be an inanimate object.

At 520, the process 500 further includes generating a plurality of model states (e.g., model state 130) for the facial rig. In some examples, a model state (e.g., the term S described above) can describe a combination of expression shapes defining an expression of the subject and a set of camera coordinates (e.g., camera position 114) in relation to the subject. The expression of the subject can include one or more values for one or more attributes that can cause the facial rig to correspond to an expression, such as a smile, frown, or other facial state. The set of camera coordinates can include abscissa, ordinate, applicate, pitch, yaw, roll, or any combination thereof.

In some examples, a model state of the plurality of model states can be generated by modifying one or more expression shapes. In such examples, the one or more expression shapes can be modified to correspond to one or more expressions of the face of the subject. In some examples, a model state of the plurality of model states can be generated by modifying one or more coordinates of a set of camera coordinates. In such examples, the one or more coordinates of the set of camera coordinates can represent a deviation from a camera rest pose. In some examples, the plurality of model states can be generated based on one or more expected conditions of the frame. For example, an expected condition can include a camera setup that is intended to be used.

At 530, the process 500 further includes determining a lighting characteristic (e.g., lighting 116) to use for rendering a computer-generated image of a model state of the plurality of model states. In some examples, the lighting characteristic can be determined based on the one or more expected conditions. In some examples, the expected conditions can be based on a camera setup and/or a location that one or more images are going to be taken. In some examples, the one or more expected conditions can be an estimate of possible locations.

At 540, the process 500 further includes rendering a plurality of computer-generated images (e.g., training image 132) of a face of the subject. In some examples, a computer-generated image can be rendered using the lighting characteristic and a corresponding model state (e.g., model state 130) of the facial rig. In some examples, a lighting characteristic used for rendering a first computer-generated image of a model state of the plurality of model states can be different than a lighting characteristic used for rendering a second computer-generated image of the model state. In some examples, the lighting characteristic can be the same for a group of computer-generated images. In some examples, a model state can be the same for a group of computer-generated images, with the lightning characteristic changing.

At 550, the process 500 further includes generating a plurality of training samples (e.g., $(I_n, \hat{S}_n)$), which can be a combination of the model state 130 and the training image 132). In some examples, a training sample can include a computer-generated image and a corresponding model state. For example, a training sample can be a pair, the pair including a computer-generated image and a corresponding model state used to generate the computer-generated image.

At 560, the process 500 further includes training a learning algorithm (e.g., regressor 150) using the plurality of training samples. In some examples, the trained regressor can be configured to infer a model state that corresponds to the face of the subject captured in a frame. For example, when the trained regressor is used on an image that includes a face of the subject, the trained regressor can determine a model state that corresponds to the face of the subject. In some examples, the frame can be a current frame of an image stream (e.g., image stream 162). In some examples, the regressor can be trained by determining transitions for the training samples. In such examples, determining a transition includes predicting a first model state in a first frame and a second model state in a second frame, where the first frame precedes the second frame.

In some implementations, the process 500 can further include determining a default model state for the facial rig. In such implementations, a model state of the plurality of model states can include a modification of the default model state.

Figure 6:
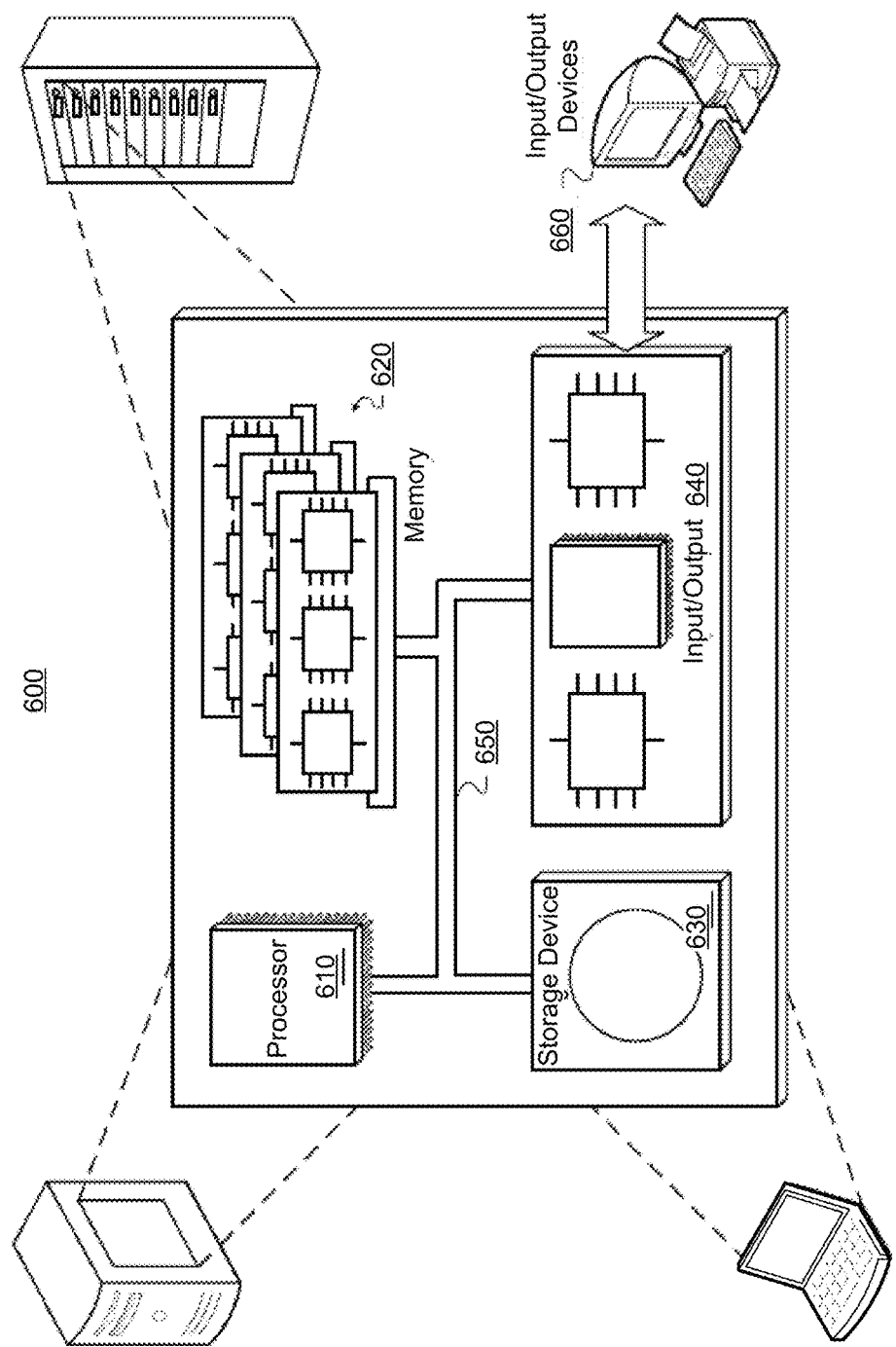
FIG. 6 illustrates an example of a computer system.

Referring to FIG. 6, a schematic diagram is shown of an example of a computer system 600. This system is exemplary only and one having skill in the art will recognize that variations and modifications are possible. The computer system 600 can be used for the operations described above. For example, the computer system 600 shown in FIG. 6 may be used to implement any or the entire tracking framework (e.g., training and tracking stage) techniques and routines described herein.

The system 6 includes a processor 610, a memory 620, a storage device 630, and an input/output interface 640. Each of the components 610, 620, 630, and 640 are interconnected using a system bus 650. The processor 610 is capable of processing instructions for execution within the computer system 600. In one implementation, the processor 610 is a single-threaded processor. In another implementation, the processor 610 is a multi-threaded processor. The processor 610 is capable of processing instructions stored in the memory 620 or on the storage device 630 to provide graphical information via input/output interface 640 for display on a user interface of one or more input/output device 660.

The memory 620 stores information within the computer system 600 and may be associated with various characteristics and implementations. For example, the memory 620 may include various types of computer-readable medium such as volatile memory, a non-volatile memory and other types of memory technology, individually or in combination.

The storage device 630 is capable of providing mass storage for the computer system 600. In one implementation, the storage device 630 is a computer-readable medium. In various different implementations, the storage device 630 may be a floppy disk device, a hard disk device, an optical disk device, or a tape device.

The input/output device 660 provides input/output operations for the computer system 600. In one implementation, the input/output device 660 includes a keyboard and/or pointing device. In another implementation, the input/output device 660 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

What is claimed is:

1. A method for markerless face tracking, the method comprising:
    obtaining a facial rig associated with a subject, wherein the facial rig includes a plurality of expression shapes, wherein an expression shape defines at least a portion of an expression of the subject and includes one or more values for one or more facial attributes;
    generating a plurality of model states for the facial rig, wherein a model state describes a combination of expression shapes defining an expression of the subject and a set of camera setup location coordinates in relation to the subject;
    determining a lighting characteristic to use for rendering a computer-generated image of a model state of the plurality of model states;
    rendering a plurality of computer-generated images of a face of the subject, wherein a computer-generated image is rendered using the lighting characteristic and a corresponding model state of the facial rig;
    generating a plurality of training samples, wherein a training sample includes a computer generated image and a corresponding model state; and
    training a regressor using the plurality of training samples, wherein the trained regressor is configured to infer a model state that corresponds to the face of the subject captured in a frame.

2. The method of claim 1, wherein a model state of the plurality of model states is generated by modifying one or more expression shapes, and wherein the one or more expression shapes are modified to correspond to an expression of the face of the subject.

3. The method of claim 1, wherein a model state of the plurality of model states is generated by modifying one or more coordinates of a set of camera coordinates, and wherein the one or more coordinates of the set of camera coordinates represent a deviation from a camera rest pose.

4. The method of claim 1, wherein a lighting characteristic used for rendering a first computer-generated image of a first model state of the plurality of model states is different than a lighting characteristic used for rendering a second computer-generated image of the first model state of the plurality of model states.

5. The method of claim 1, further comprising:
    determining a default model state for the facial rig, wherein a model state of the plurality of model states includes a modification of the default model state.

6. The method of claim 1, wherein the regressor is trained by determining transitions for the training samples, wherein a transition predicts a first model state in a first frame and a second model state in a second frame, and wherein the first frame precedes the second frame.

7. The method of claim 1, wherein the frame is a current frame of an image stream.

8. The method of claim 1, wherein the plurality of model states are generated based on one or more expected conditions of the frame, and wherein the lighting characteristic is determined based on the one or more expected conditions.

9. The method of claim 1, further comprising applying the trained regressor to infer the model state that corresponds to the face of the subject captured in the frame.

10. A system for face tracking, the system comprising:
    a memory storing a plurality of instructions; and
    one or more processors configurable to:
        obtain a facial rig associated with a subject, wherein the facial rig includes a plurality of expression shapes, wherein an expression shape defines at least a portion of an expression of the subject and includes one or more values for one or more facial attributes;
        generate a plurality of model states for the facial rig, wherein a model state describes a combination of expression shapes defining an expression of the subject and a set of camera setup location coordinates in relation to the subject;
        determine a lighting characteristic to use for rendering a computer-generated image of a model state of the plurality of model states;
        render a plurality of computer-generated images of a face of the subject, wherein a computer-generated image is rendered using the lighting characteristic and a corresponding model state of the facial rig;
        generate a plurality of training samples, wherein a training sample includes a computer-generated image and a corresponding model state; and
        train a regressor using the plurality of training samples, wherein the trained regressor is configured to infer a model state that corresponds to the face of the subject captured in a frame.

11. The system of claim 10, wherein a model state of the plurality of model states is generated by modifying one or more expression shapes, and wherein the one or more expression shapes are modified to correspond to an expression of the face of the subject.

12. The system of claim 10, wherein a model state of the plurality of model states is generated by modifying one or more coordinates of a set of camera coordinates, and wherein the one or more coordinates of the set of camera coordinates represent a deviation from a camera rest pose.

13. The system of claim 10, wherein a lighting characteristic used for rendering a first computer-generated image of a first model state of the plurality of model states is different than a lighting characteristic used for rendering a second computer-generated image of the first model state of the plurality of model states.

14. The system of claim 10, wherein the regressor is trained by determining transitions for the training samples, wherein a transition predicts a first model state in a first frame and a second model state in a second frame, and wherein the first frame precedes the second frame.

15. The system of claim 10, wherein the plurality of model states are generated based on one or more expected conditions of the frame, and wherein the lighting characteristic is determined based on the one or more expected conditions.

16. A computer-readable memory storing a plurality of instructions executable by one or more processors, the plurality of instructions comprising instructions that cause the one or more processors to:
    obtain a facial rig associated with a subject, wherein the facial rig includes a plurality of expression shapes, wherein an expression shape defines at least a portion of an expression of the subject and includes one or more values for one or more facial attributes;
    generate a plurality of model states for the facial rig, wherein a model state describes a combination of expression shapes defining an expression of the subject and a set of camera setup location coordinates in relation to the subject;

determine a lighting characteristic to use for rendering a computer-generated image of a model state of the plurality of model states;

render a plurality of computer-generated images of a face of the subject, wherein a computer-generated image is rendered using the lighting characteristic and a corresponding model state of the facial rig;

generate a plurality of training samples, wherein a training sample includes a computer-generated image and a corresponding model state; and train a regressor using the plurality of training samples, wherein the trained regressor is configured to infer a model state that corresponds to the face of the subject captured in a frame.

17. The computer-readable memory of claim 16, wherein a model state of the plurality of model states is generated by modifying one or more expression shapes, and wherein the one or more expression shapes are modified to correspond to an expression of the face of the subject.

18. The computer-readable memory of claim 16, wherein a model state of the plurality of model states is generated by modifying one or more coordinates of a set of camera coordinates, and wherein the one or more coordinates of the set of camera coordinates represent a deviation from a camera rest pose.

19. The computer-readable memory of claim 16, wherein a lighting characteristic used for rendering a first computer-generated image of a first model state of the plurality of model states is different than a lighting characteristic used for rendering a second computer-generated image of the first model state of the plurality of model states.

20. The computer-readable memory of claim 16, wherein the regressor is trained by determining transitions for the training samples, wherein a transition predicts a first model state in a first frame and a second model state in a second frame, and wherein the first frame precedes the second frame.

21. The computer-readable memory of claim 16, wherein the plurality of model states are generated based on one or more expected conditions of the frame, and wherein the lighting characteristic is determined based on the one or more expected conditions.

* * * * *